Aug. 18, 1931.    J. F. LINCOLN    1,819,182
DYNAMO ELECTRIC MACHINE
Filed July 23, 1927

INVENTOR.
James F. Lincoln
BY
Fay, Oberlin & Fay
ATTORNEYS.

Patented Aug. 18, 1931

1,819,182

UNITED STATES PATENT OFFICE

JAMES F. LINCOLN, OF EAST CLEVELAND, OHIO, ASSIGNOR TO THE LINCOLN ELECTRIC COMPANY, OF CLEVELAND, OHIO, A CORPORATION OF OHIO

DYNAMO-ELECTRIC MACHINE

Application filed July 23, 1927. Serial No. 207,992.

In the operation of dynamo-electric machines, especially motors, more or less heat is generated. Particularly in the case of motors subject to frequent stopping and starting, as for instance elevator motors, the heat production is considerable. This is fundamentally undesirable, and in some cases tends to be a serious factor. It is among the objects of this invention to provide a means for transferring heat from the internal portions of such machinery, in a manner to secure highly efficient cooling. More particularly it is an object to provide heat drains in the rotor to carry the heat from the deeper portion of the laminations out to the ends so as to be in exposure to the air circulating through the motor or the like. A further object is the provision of heat drains on the ends of rotor rods to additionally also act as a fan system. Another object is the arrangement of heat drains in the stator so that cross-pieces are in heat-conductive contact with circular members extending around the stator and embedded in the laminations. A still further object is the arrangement of elements in heat-conductive contact with the end rings of the stator, and these again in contact with the end housings, whereby the amount of heat-dissipating surface is enormously extended. Other objects and advantages will appear as the description proceeds.

To the accomplishment of the foregoing and related ends, the invention, then, consists of the features hereinafter fully described, and particularly pointed out in the claims, the following description and the annexed drawings setting forth in detail certain structure embodying the invention, such being illustrative however of but one of various ways in which the principle of the invention may be employed.

In said annexed drawings:—

Figure 1:
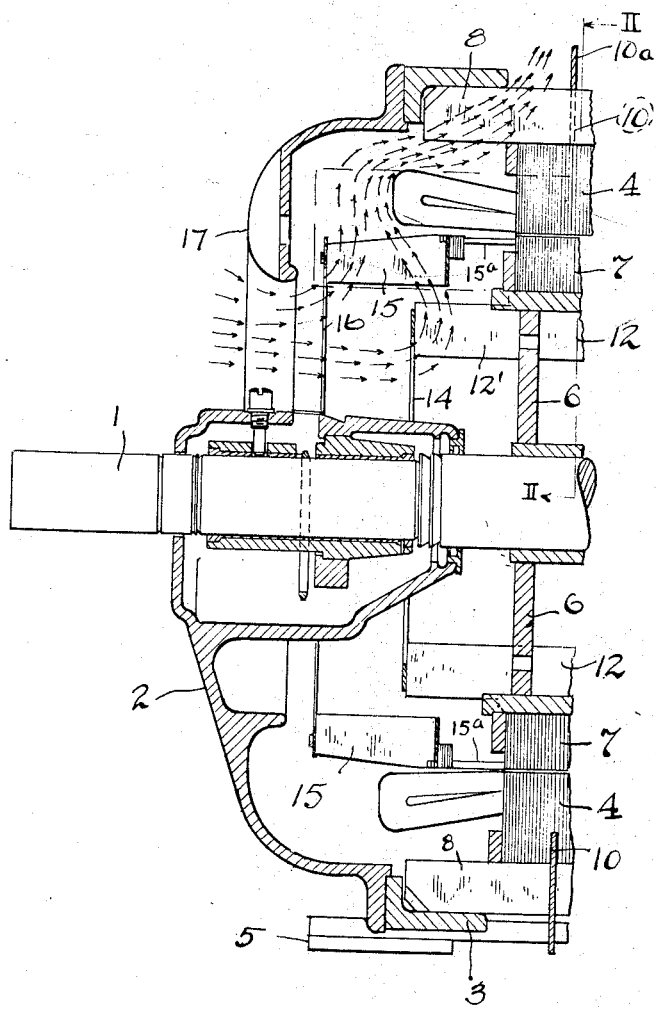
Figure 2:
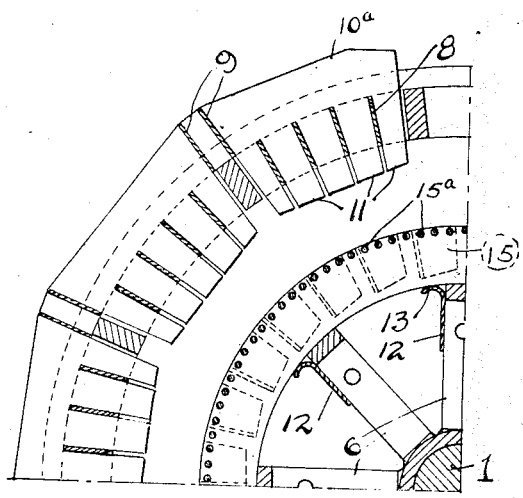

Fig. 1 is a fragmentary vertical axial section showing an embodiment of the invention; and Fig. 2 is a sectional detail taken on a plane indicated by the line II—II, Fig. 1.

As illustrated in the drawings, a motor having a shaft 1 mounted in the bearing support or end housings 2 secured in turn to the end rings 3 of the frame, is provided with a stator 4, the frame being supported on a footing 5 as customary. Rotatably carried by the shaft is a rotor having radial arms 6 supporting the rotor core 7. In the stator, preferably embedded in the laminated structure are heat drains or heat-conducting elements of a metal efficient for such purpose, for instance copper or brass. These elements may comprise axially arranged bars or cross-pieces 8, 9, and circumferential members 10, preferably connected at the intersections. The circumferential members for instance may desirably present tooth like digitations 11 seating so as to intermesh with the axial members 9. The axial members thence project laterally, standing out so as to present exposure. Analogously also the circumferential elements present outstanding fins 10a. The heat conducting structure thus interbedded with the stator is in a position to transfer the heat from within to the outer air-exposed projections or fins.

On the rotor, and particularly on the rotor arms, there are also mounted heat drains or elements 12 which are effective to transfer heat, and preferably these elements furthermore are shaped to operate as fan blades, an advantageous form including a recurved outer edge as at 13. Projecting endwise from the rotor framing, the blades are joined in turn to an outrigger-ring 14, the extension 12a of the blades thus constituting an end-projecting fan system. Peripheral-wise of such blades, and also preferably displaced somewhat axially is another set of blades 15 projecting from the transversely disposed conductor rods 15a and joined at their ends by a ring 16, and these blades desirably are slightly canted or inclined axially, whereby to afford a directive blower effect. At the end of the machine, a guard-deflector 17 is arranged such as to more efficiently feed the air to the path of the blades.

As will be readily understood from the foregoing, the heat produced internally is transmitted by the heat-conducting elements respectively and these at their exposed portions in the air then function to give up heat to the passing air currents, an active circulation being furthered by the moving blades directing such air currents across the path of the fin projections. The heat-drains in the rotor carry the heat from the interior out to the ends in exposure to the air circulating through the machine. The blades 15 on the ends of the rotor rods carry the heat from the rotor rods and at the same time act as fans. The arrangement, furthermore, of the heat-drains in the stator so that the cross-pieces or axial elements are in heat-conductive relation with the circular drain-elements embedded in the laminations serves to effectively conduct the heat, this constituting in effect a vast mesh or gathering system for all that structure. The heat-drains are also welded to the end rings of the stator, and these in turn are in contact with the end housings. Accordingly the amount of surface effective is enormously increased over that which is generally obtained in the ordinary construction heretofore. Furthermore by reason of the fan blade effect the amount of air carried through and across these heat surfaces is also enormously increased. With such equipment, heavy duty motors which are subject normally to serious overheating, are able to show an increased efficiency and durability in service comparable to more favorably operated machinery.

Other modes of applying the principle of the invention may be employed, change being made as regards the details disclosed, provided the means stated in any of the following claims, or the equivalent of such be employed.

I therefore particularly point out and distinctly claim as my invention:—

1. In apparatus of the character described, the combination of a rotor, a stator, and circumferential and axial heat-conducting elements embedded in said stator and having peripherally uncovered exposure to the air beyond.

2. In apparatus of the character described, the combination of a rotor, a stator, and circumferential and axial heat-conducting elements embedded in said stator and connected together and having projecting fins.

3. In apparatus of the character described, the combination of a rotor, a stator, circumferential and axial heat-conducting elements embedded in said stator and having projecting fins, and means for directing air currents on such fins.

4. In apparatus of the character described, the combination of a rotor, a stator, circumferential and axial heat-conducting elements embedded in said stator and having projecting fins, and blades carried by said rotor for directing air on said fins.

5. In apparatus of the character described, the combination of a stator, a rotor, circumferential and axial heat-conducting blades embedded in said stator and connected together and having projecting fins, radial blades on the rotor having recurved outer edges, and other blades axially inclined carried by said rotor peripheral-wise of the first-named blades.

6. In a dynamo electric machine, the combination with a stator, of a rotor including transversely disposed electrical conductor rods embedded in its outer portion, blades of heat-conductive material connected with said rods, said blades being arranged and constructed to act as a fan, and other members of heat-conductive material contacting with the internal diameter of the laminations of said rotor and extending beyond the ends thereof, the projecting portions of said last-named members being also arranged and constructed to act as a fan.

7. In an electric motor, the combination with a stator and a rotor, of fan blades connected to the rotor and projecting from the ends thereof, and a continuous peripheral blade of high heat conductivity extending around an intermediate portion of the stator in a plane perpendicular to the axis of the rotor to deflect outwardly in a radial direction the air currents created by the fan blades on the rotor.

8. In an electric motor, the combination of a frame, a stator secured within the frame and having laminations with field windings thereon, a rotor mounted within the stator, a peripheral blade extending continuously around an intermediate portion of the stator, stationary blades of high heat conductivity connected to said peripheral blade and traversing the space between said peripheral blade and the motor frame and fan blades connected to the rotor and projecting from the ends thereof whereby to create air currents past said stationary blades, said peripheral blade being in a plane perpendicular to the axis of the rotor to deflect said air currents outwardly in a radial direction.

9. In an electric motor, the combination with a stator and a rotor having laminations, of a housing partially enclosing the stator but having an inlet in its end near the axis of the rotor and an outlet between its ends, said housing providing a space for air currents to flow outwardly from said inlet to said outlet between the housing and the stator, fan blades on the ends of the rotor to set up such air currents, and vanes extending across said space in axial planes and secured to the stator and the housing, said vanes having connections of high heat conductivity with the stator laminations, whereby heat is drained from the interior of the stator and dissipated by the currents of air flowing past the radial surfaces of said vanes.

10. In apparatus of the character described, the combination of a rotor, a stator, and circumferential and axial heat-conducting elements in intimate heat conductive relation with said stator and connected together and having projecting fins.

Signed by me, this 22d day of July, 1927.
JAMES F. LINCOLN.